(12) United States Patent
Nagasaka

(10) Patent No.: US 7,212,363 B2
(45) Date of Patent: May 1, 2007

(54) MAGNETIC DISK APPARATUS

(75) Inventor: Yoshiyuki Nagasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 10/988,223

(22) Filed: Nov. 12, 2004

(65) Prior Publication Data

US 2006/0007590 A1    Jan. 12, 2006

(30) Foreign Application Priority Data

Jul. 12, 2004    (JP) .............................. 2004-204170

(51) Int. Cl.
G11B 5/09    (2006.01)
(52) U.S. Cl. ..................................... 360/48; 360/77.08
(58) Field of Classification Search ...................... None
See application file for complete search history.

(56) References Cited

U.S. PATENT DOCUMENTS

| | | | | |
|---|---|---|---|---|
| 5,036,408 A | * | 7/1991 | Leis et al. ..................... 360/48 |
| 5,287,468 A | * | 2/1994 | Furuhashi et al. ............. 710/5 |
| 5,523,903 A | * | 6/1996 | Hetzler et al. ........... 360/77.08 |
| 5,548,599 A | * | 8/1996 | Furuhashi et al. .......... 714/769 |
| 5,589,998 A | * | 12/1996 | Yu .......................... 360/78.14 |
| 5,640,286 A | * | 6/1997 | Acosta et al. ................. 360/48 |
| 5,734,862 A | * | 3/1998 | Kulas ......................... 711/157 |
| 5,903,404 A | * | 5/1999 | Tsurumi et al. ................ 360/48 |
| 6,072,650 A | * | 6/2000 | Wilson ......................... 360/51 |
| 6,108,150 A | * | 8/2000 | Lee ............................. 360/48 |
| 6,144,514 A | * | 11/2000 | Wu .............................. 360/51 |
| 6,433,948 B1 | * | 8/2002 | Lee ............................. 360/75 |
| 6,441,981 B1 | * | 8/2002 | Cloke et al. ................... 360/51 |
| 6,449,111 B1 | * | 9/2002 | Kool et al. .................... 360/48 |
| 6,574,589 B1 | * | 6/2003 | Shoyama ....................... 703/25 |
| 6,671,114 B2 | * | 12/2003 | Bang ............................ 360/48 |
| 6,678,106 B2 | * | 1/2004 | Hoskins et al. ................ 360/48 |
| 6,765,860 B2 | * | 7/2004 | Tobita et al. ............. 369/275.4 |
| 2002/0196718 A1 | * | 12/2002 | Okazaki et al. .......... 369/47.34 |
| 2005/0041551 A1 | * | 2/2005 | Hyen ....................... 369/53.31 |

FOREIGN PATENT DOCUMENTS

| | | |
|---|---|---|
| JP | 2000-155901 | 6/2000 |
| JP | 2003-331527 | 11/2003 |

* cited by examiner

Primary Examiner—Andrea Wellington
Assistant Examiner—Dismery Mercedes
(74) Attorney, Agent, or Firm—Greer, Burns & Crain, Ltd.

(57) ABSTRACT

A magnetic disk apparatus formats a single data frame as a single sector. The magnetic disk apparatus includes a read-out control unit that controls to read-out sector data by emulating an existing format (e.g., "512 bytes/sector"), and a write-in control unit that controls to write sector data by emulating the existing format (e.g., "512 bytes/sector"), when the magnetic disk apparatus receives a read command or a write command based on a format (e.g., "512 bytes/sector") that is different from a format of the magnetic disk apparatus (i.e., one sector/one data frame) from a host.

2 Claims, 6 Drawing Sheets

MAGNETIC DISK APPARATUS

BACKGROUND OF THE INVENTION

1) Field of the Invention

The present invention relates to a magnetic disk apparatus having servo frames that store servo information and data frames that store sector data between the servo frames, and more particularly, to a magnetic disk apparatus that can improve formatting efficiency.

2) Description of the Related Art

Conventionally, a magnetic disk apparatuses serving as an external storage for a computer has servo frames that store servo information (information for carrying out position control of a head or speed control), and data frames that store sector data between the servo frames (see, for example, Japanese Patent Application Laid-open No. 2003-331527).

The magnetic disk apparatus stores sector data in which a "preamble", a "sync mark", an "ECC", and a "Gap" are added to user data "512 bytes" in the data frame for each sector. The user data is managed with a fixed data size (i.e., "512 bytes") in the magnetic disk apparatus. However, depending on a user, the user data may be managed with different data size, such as "528 bytes".

In a conventional technology disclosed in the Japanese Patent Application Laid-open No. 2003-331527, because the user data is managed with the fixed data size (i.e., "512 bytes"), the greater the number of sectors that are stored in the data frame, the more areas that are not related to user capacity (such as the "preamble", the "sync mark", the "ECC", the "Gap") are needed, and therefore, a formatting capacity cannot be improved.

A magnetic disk apparatus having a high storage density is continuously developed in recent years. Therefore, the number of sectors stored within the data frame is markedly increasing, and even more areas that are not related to the user capacity are needed accordingly.

SUMMARY OF THE INVENTION

It is an object of the present invention to solve at least the above problems in the conventional technology.

A magnetic disk apparatus according to one aspect of the present invention includes a servo frame that stores servo information, and a data frame that stores sector data between the servo frames. A single data frame is formatted as a single sector.

According to the present invention, when the magnetic disk apparatus receives a read-out request based on a format that is different from a format of the magnetic disk apparatus, the magnetic disk apparatus controls to read first sector data of a single data frame including second sector data relating to the read-out request, to extract the second sector data from the first sector data, and to read-out the second sector data extracted as read-out data.

According to the present invention, when the magnetic disk apparatus receives a write-in request based on a format that is different from a format of the magnetic disk apparatus, the magnetic disk apparatus controls to read first sector data of a single data frame including an area that is an object of write-in control, to embed second sector data relating to the write-in request in the area, and to write-in the first sector data, in which the second sector data is embedded, as write data.

The other objects, features, and advantages of the present invention are specifically set forth in or will become apparent from the following detailed description of the invention when read in conjunction with the accompanying drawings.

DETAILED DESCRIPTION

Exemplary embodiments of a magnetic disk apparatus according to the present invention will be described below in detail with reference to the accompanying drawings.

Figure 1:
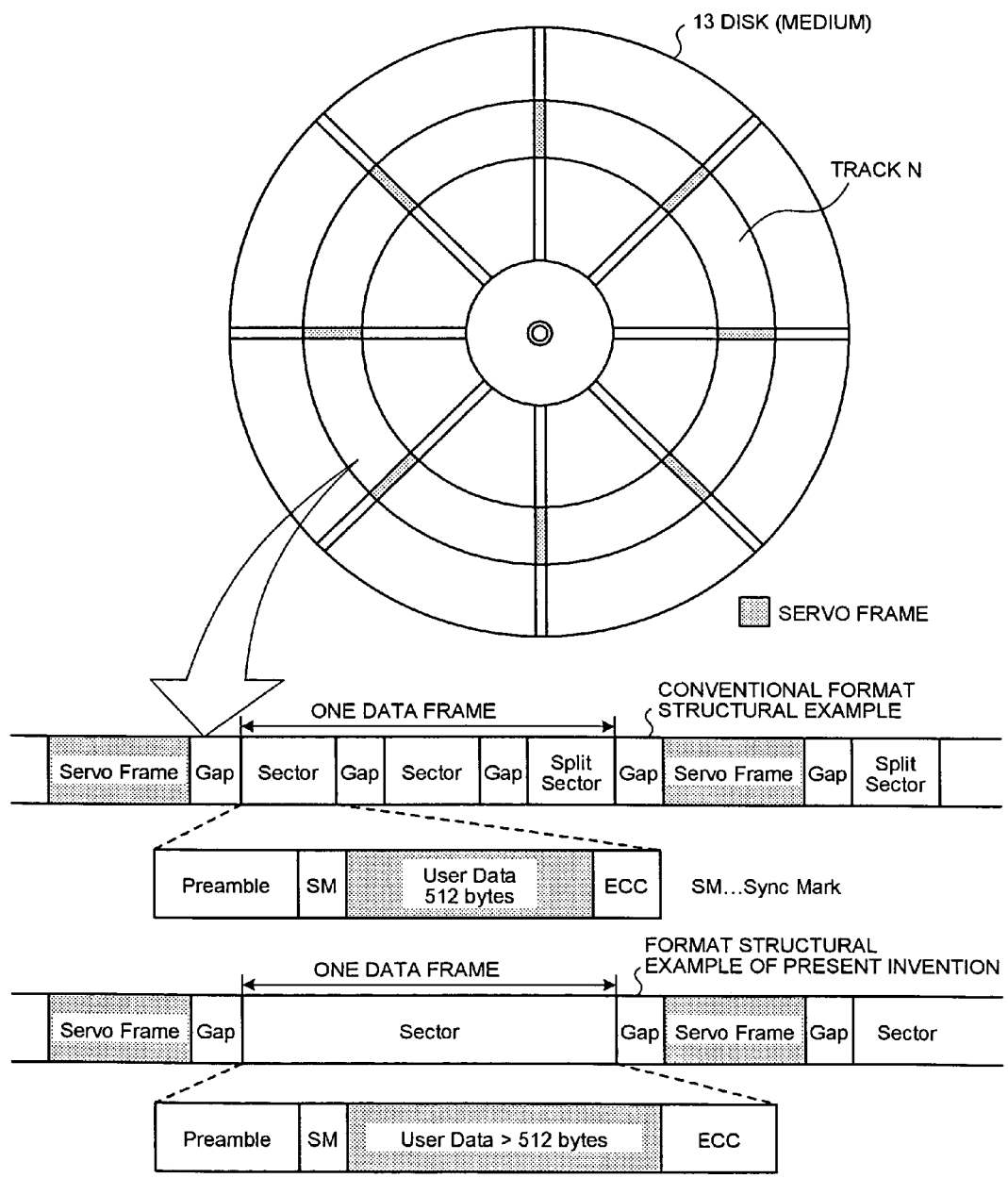
FIG. 1 is a schematic for illustrating an outline and features of a magnetic disk apparatus according the present invention.

FIG. 1 is a schematic for illustrating an outline and features of a magnetic disk apparatus according the present invention. The magnetic disk apparatus 10 has servo frames that store servo information (information for carrying out position control of a head or speed control), and data frames that store sector data between the servo frames.

A main feature of the magnetic disk apparatus according the present invention is that one data frame is formatted as one sector. Areas that are not related to user capacity (areas such as a "preamble", a "sync mark", an "ECC", a "Gap") are thereby reduced, and accordingly, formatting efficiency can be improved.

To describe this main feature concretely, the areas that are not related to user capacity are needed for each sector. Therefore, in the magnetic disk apparatus according the present invention, a sector size is increased in order to reduce the areas that are not related to user capacity.

Namely, in the magnetic disk apparatus according the present invention, one data frame is formatted as one sector, in order to make the sector size as large as possible without increasing the areas that are not related to user capacity. The reasons why one data frame is formatted as one sector are to prevent a large amount of the areas that are not related to user capacity from being generated due to storing of a plurality of sectors in a data frame, and to, when split sectors are stored before and after the servo frame (including cases that a data size of one data frame or more is used as one sector), prevent the areas that are not related to user capacity from being respectively inserted in the split sectors before and after.

Therefore, by formatting one data frame as one sector (refer to a format structural example of the present invention in FIG. 1), a total amount of the areas that are not related to user capacity can be made to be a minimum.

Accordingly, in terms of the aforementioned example of the prior art, by formatting the fixed sector size (i.e., "512 bytes") as one sector (see a conventional format structural example in FIG. 1), a plurality of sector numbers are not stored in the data frame, and one data frame is formatted as one sector (see the format structural example of the present invention in FIG. 1). Therefore, the total amount of the areas that are not related to user capacity can be made to be a minimum, and the formatting efficiency can be improved as is the aforementioned main feature.

In relation thereto, by making the total amount of the areas that are not related to user capacity be a minimum, a same user capacity as user capacities realized by existing formats can be realized at a lower storage density. Therefore, accuracy of reading control/writing control of the head is not made stricter than needed, and difficulty in realizing the apparatus can be reduced. By making the total amount of the areas that are not related to user capacity be a minimum, it is possible to provide a larger user capacity than the user capacities realized by the existing formats.

Figure 2:
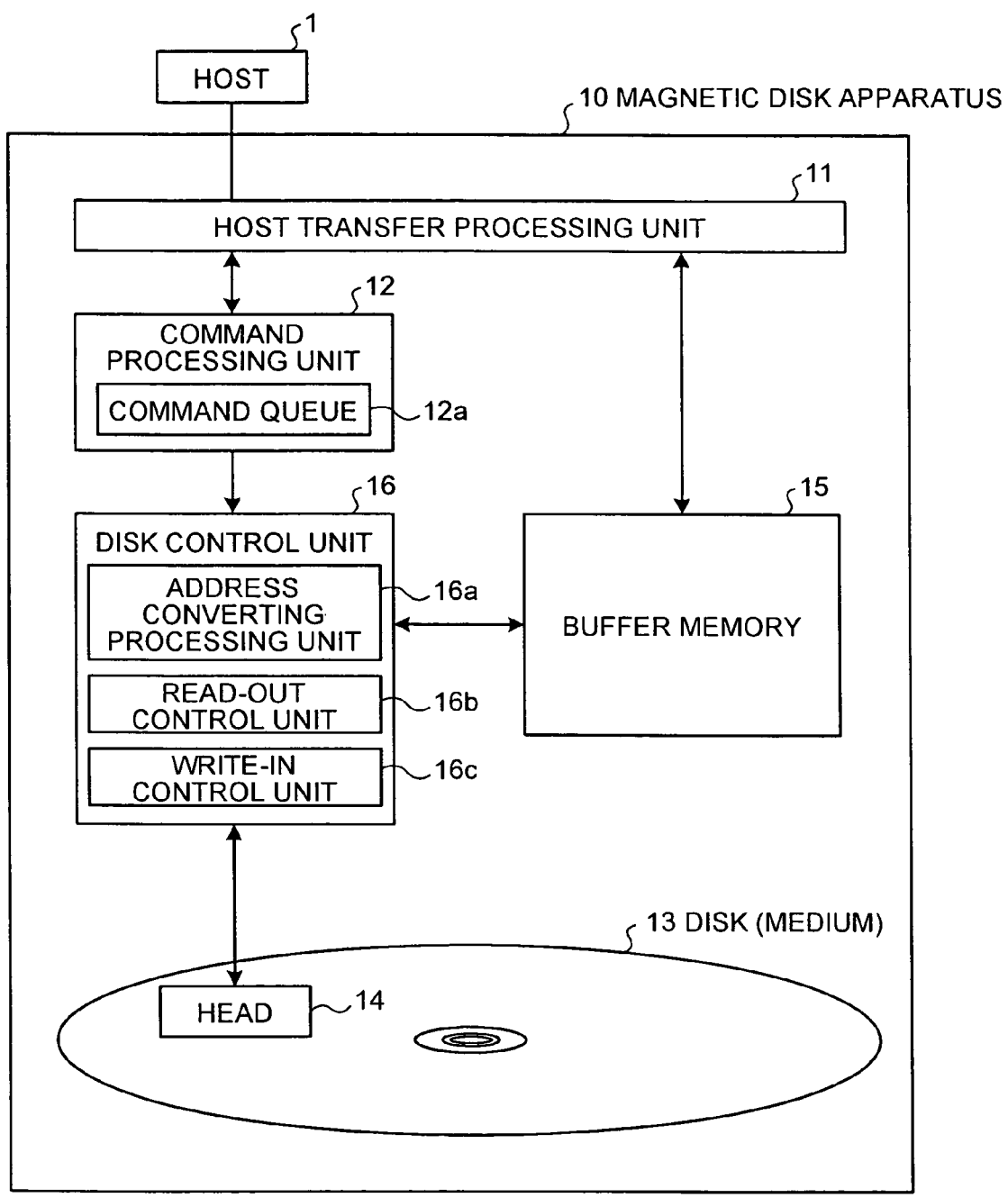
FIG. 2 is a block diagram of a magnetic disk apparatus according an embodiment of the present invention.

FIG. 2 is a block diagram of a magnetic disk apparatus according an embodiment of the present invention. The magnetic disk apparatus 10 is structured from a host transfer processing unit 11, a command processing unit 12, a disk (a medium) 13, a head 14, a buffer memory 15, and a disk control unit 16.

The host transfer processing unit 11 is a processing unit that transmits and receives commands and data to and from a host 1. Specifically, the host transfer processing unit 11 accepts a read command or a write command from the host 1, and transfers and receives data to and from the disk control unit 16 via the buffer memory 15.

The command processing unit 12 executes a command by analyzing the command received from the host 1 and instructing processing thereof by the host transfer processing unit 11 and the disk control unit 16. The command processing unit 12 has a command queue 12a that, at the time of analyzing the command, temporarily holds (queues) the command that is analyzed as not to be (as unable to be) executed immediately. The command queue 12a changes an order of execution of commands by queuing the commands.

The disk 13 is a magnetic disk that stores user data such as applications, desired data, and the like. The buffer memory 15 is a buffer processing unit temporarily storing data that is transmitted and received to and from the host 1.

The disk control unit 18 has a memory that expands firmware that carries out, with respect to the disk 13, a read command (a read-out request) or a write command (a write-in request) instructed by the command processing unit 12, and is a processing unit that executes various types of processes thereby. The disk control unit 18 has, as units that are particularly closely related to the present invention, an address converting processing unit 16a, a read-out control unit 16b, and a write-in control unit 16c.

Figure 5:
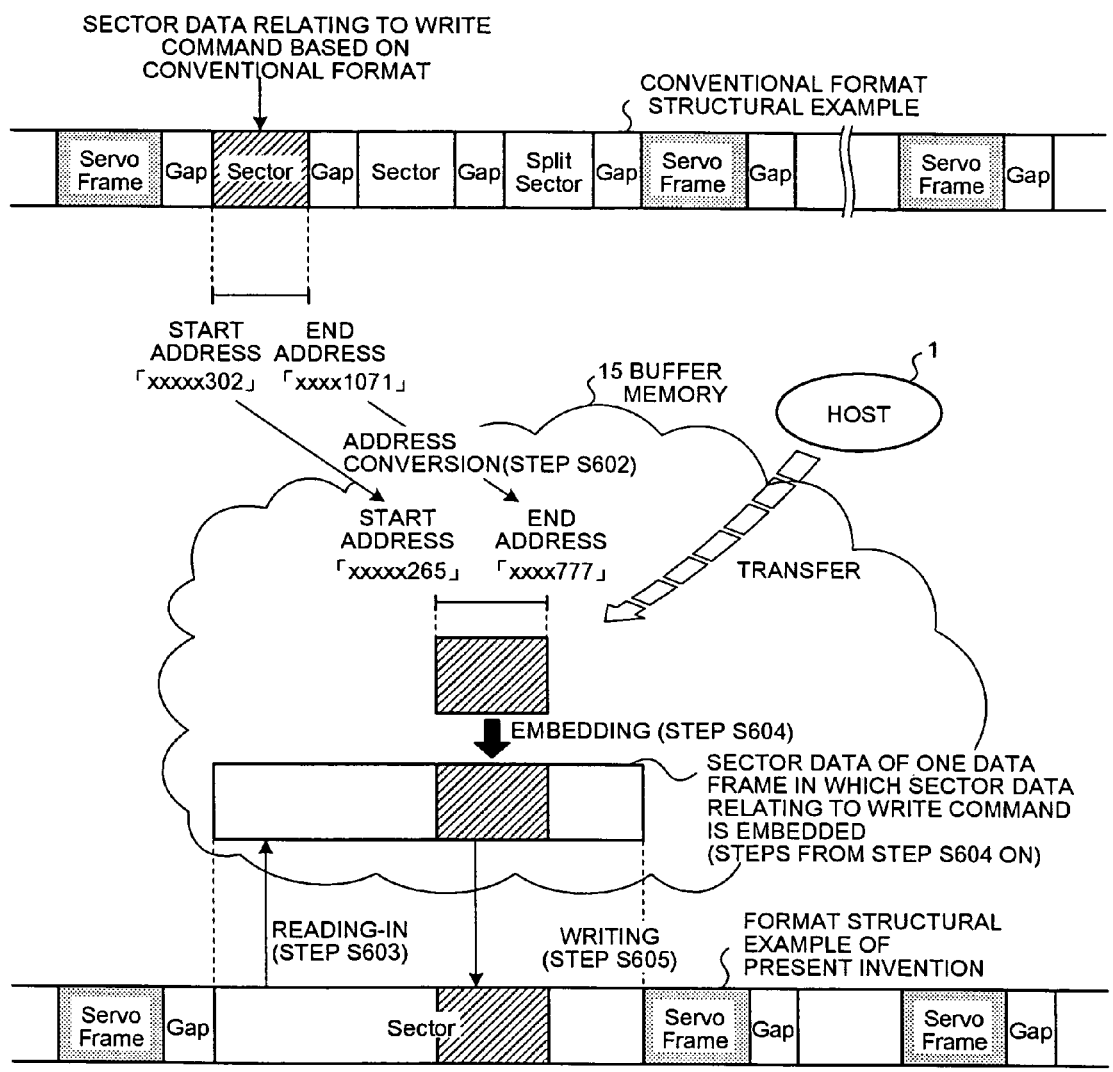
FIG. 5 is a schematic for illustrating an operation of a write-in control unit.

The address converting processing unit 16a is a processing unit that converts sector data relating to the read-out request or addresses that are objects of writing control, into addresses that correspond to a format of that magnetic disk apparatus 10. Specifically, as shown in FIG. 3 or FIG. 5, when the address converting processing unit 16a accepts from the host 1 a command (i.e., the read command or the write command) based on a format (e.g., "512 bytes/sector") that is different from the format (i.e., 1 sector/1 data frame) of that magnetic disk apparatus, the address converting processing unit 16a converts the sector data relating to the read command or the addresses that are the objects of writing control (e.g., a start address "XXXXX302" and an end address "XXXX1071) into addresses (a start address "XXXXX265" and an end address "XXXXX777") corresponding to the format of that magnetic disk apparatus 10.

The read-out control unit 16b is a processing unit that effects control so as to read the sector data of one data frame including the sector data relating to the read-out request, and extract the sector data relating to the read-out request from the sector data of one data frame that has been read, and read-out the extracted sector data as read-out data.

Figure 3:
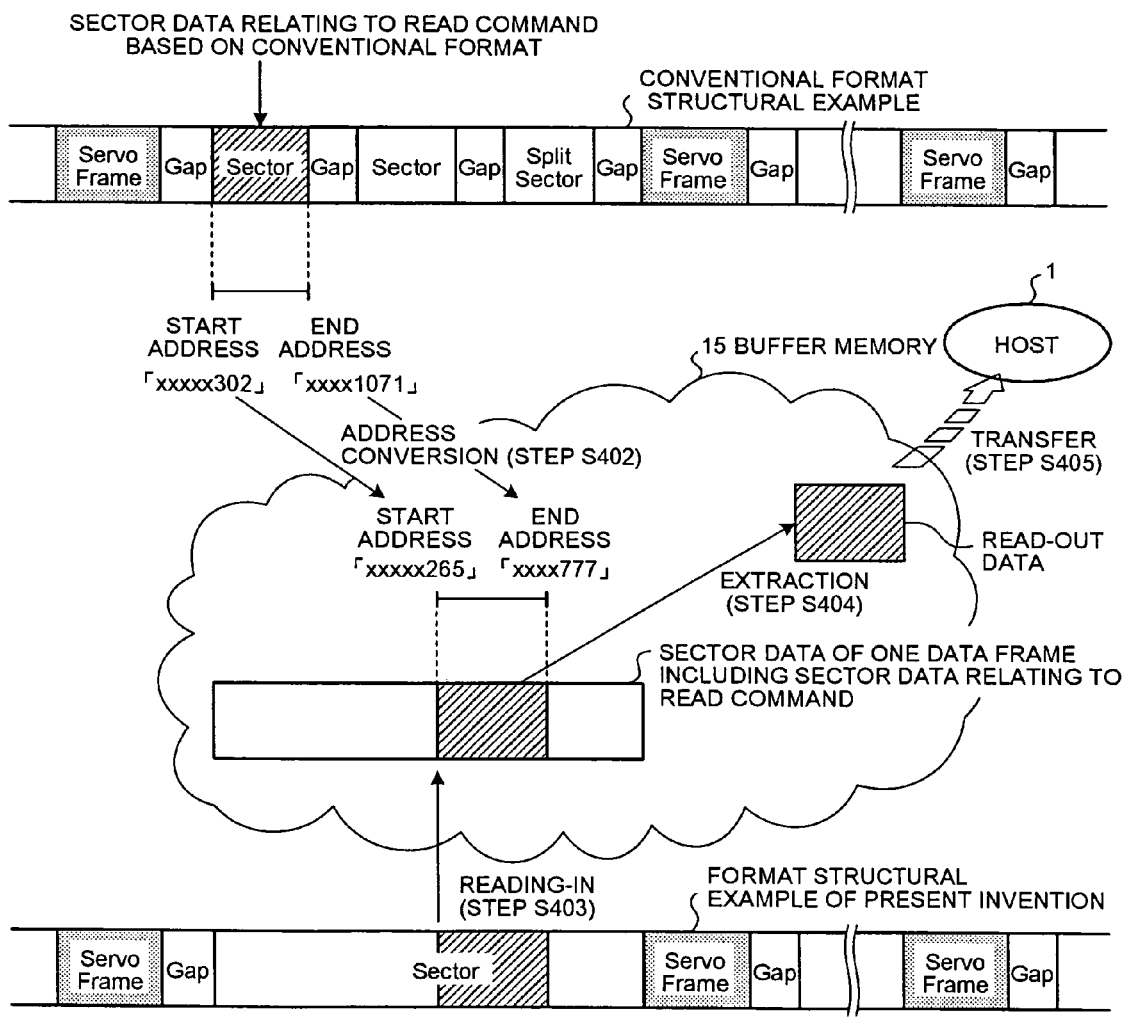
FIG. 3 is a schematic for illustrating an operation of a read-out control unit.

Specifically, as shown in FIG. 3, the read-out control unit 16b reads from the disk 13 the sector data of one data frame including the sector data (e.g., the start address "XXXXX265" and the end address "XXXXX777" converted by the address converting processing unit 16a) relating to the read command (read-out request) and expands it in the buffer memory 15, and extracts the sector data (the start address "XXXXX265" and the end address "XXXXX777") relating to the read command from the sector data of one data frame that is expanded at the buffer memory 15, and transfers the extracted sector data to the host 1 as read-out data.

Therefore, the format existing at the firm side (e.g., "512 bytes/sector") can be emulated and the sector data can be read-out, and compatibility with existing formats can be ensured.

The write-in control unit 16c is a processing unit that effects control so as to read the sector data of one data frame including a area that is an object of writing control, and embed sector data relating to the write-in request into the area that is the object of writing control in the read sector data of one data frame, and write the sector data of one data frame, in which the sector data relating to the write-in request is embedded, as write data.

Specifically, as shown in FIG. 5, the write-in control unit 16c reads the sector data of one data frame including the area that is the object of writing control (the start address "XXXXX265" and the end address "XXXXX777" converted by the address converting processing unit 16a) and expands it at the buffer memory 15, and embeds the sector data (the data transferred in from the host 1) relating to the write command in the area that is the object of writing control (the start address "XXXXX265" and the end address "XXXXX777") in the sector data of one data frame expanded at the buffer memory 15, and writes the sector data of one data frame, in which the sector data relating to that write command is embedded, to the disk 13 as write data.

Therefore, the format existing at the firm side (e.g., "512 bytes/sector") can be emulated and the sector data can be written, and compatibility with existing formats can be ensured.

Figure 4:
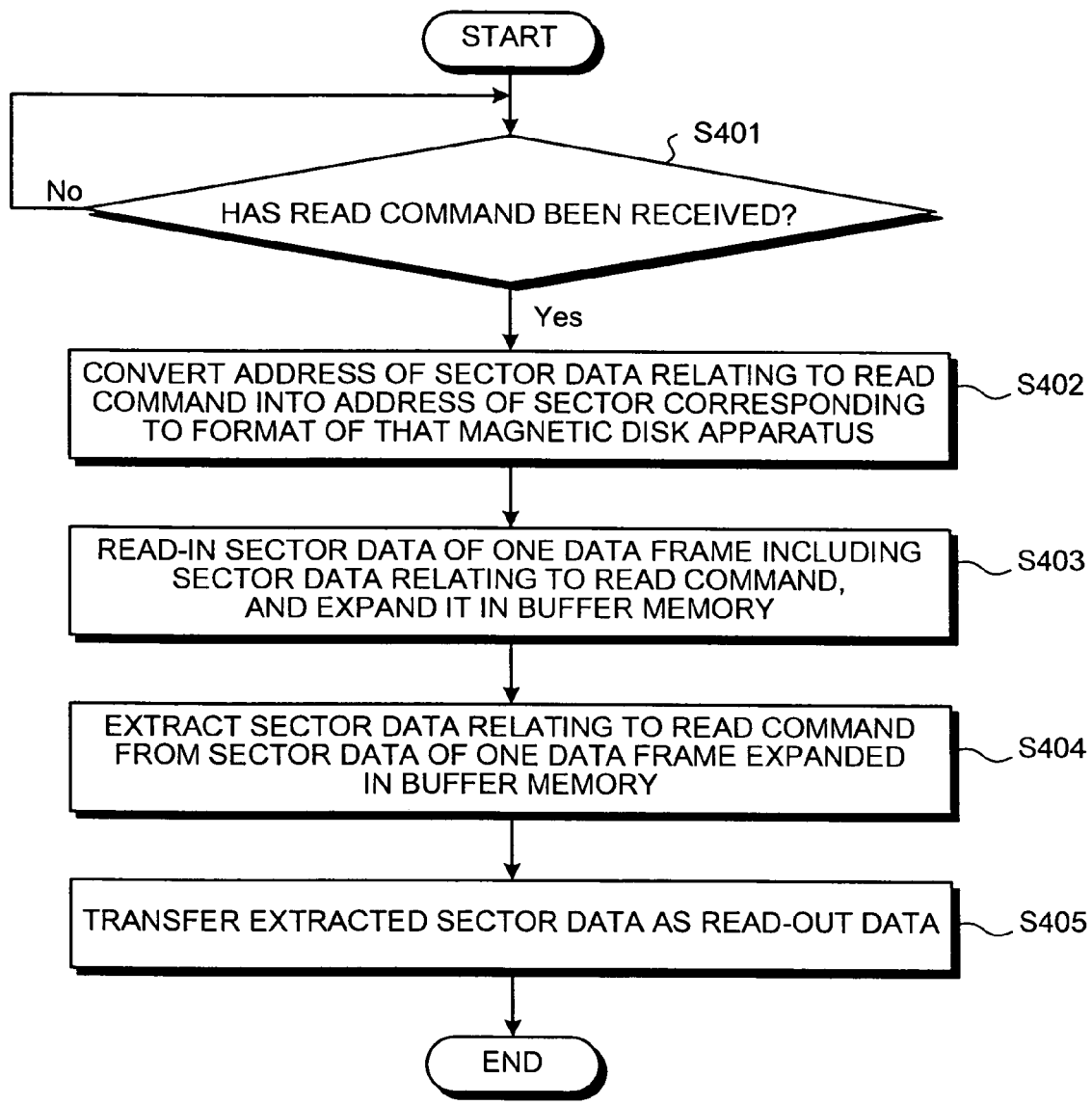
FIG. 4 is a flowchart of a process procedure for a read-out control process.

FIG. 4 is a flowchart of a process procedure for a read-out control process. The "read-out control process" is started when the read command (read-out request) is accepted from the host 1. In the present embodiment, description will be given of "read-out control process" when the host 1 recognizes the format of the disk 13 as "512 bytes/sector" and issues the read command.

When the read command is accepted from the host 1 via the host transfer processing unit 11 (step S401), the command processing unit 12 issues a read command to the disk control unit 16. As shown in FIG. 3, the address converting processing unit 16a converts the addresses (e.g., the start address "XXXXX302" and the end address "XXXX1071") of the sector data relating to the read command that is based on the existing (conventional) format of "512 bytes/sector" into addresses (the start address "XXXXX265" and the end address "XXXXX777") corresponding to the format of that magnetic disk apparatus 10 (step S402).

The read-out control unit 16b then reads from the disk 13 the sector data of one data frame including the sector data (i.e., the start address "XXXXX265" and the end address "XXXXX777" converted by the address converting processing unit 16a) relating to the read command and expands it at the buffer memory 15 (step S403), and extracts (step S404)

the sector data (the start address "XXXXX265" and the end address "XXXXX777") relating to the read command from the sector data of one data frame expanded at the buffer memory 15, and transfers the extracted sector data to the host 1 as read-out data (step S405).

Figure 6:
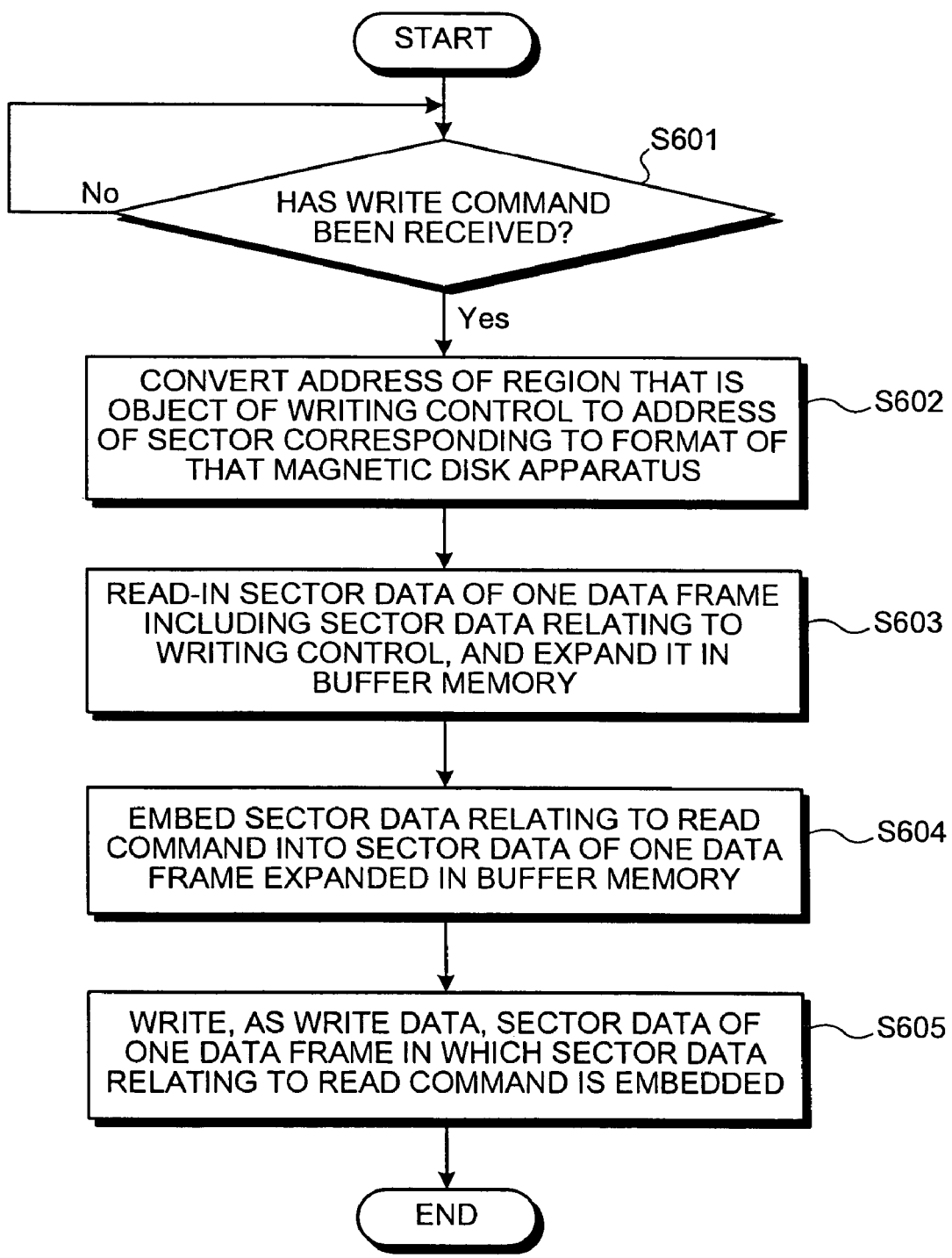
FIG. 6 is a flowchart of a process procedure for a write-in control process.

FIG. 6 is a flowchart of a process procedure for a write-in control process. The "write-in control process" starts when a write command (write-in request) is accepted from the host 1. In the present embodiment, description will be given of "write-in control process" when the host 1 recognizes the format of the disk 13 as "512 bytes/sector" and issues the write command.

When the write command is accepted from the host 1 via the host transfer processing unit 11 (step S601), the command processing unit 12 issues a write command to the disk control unit 16. As shown in FIG. 5, the address converting processing unit 16a converts the addresses (e.g., the start address "XXXXX302" and the end address "XXXX1077") of the area that is the object of the writing control that is based on the existing (conventional) format of "512 bytes/sector" into addresses (the start address "XXXXX265" and the end address "XXXXX777") corresponding to the format of that magnetic disk apparatus 10 (step S602).

The write-in control unit 16c then reads the sector data of one data frame including the area that is the object of the writing control (the start address "XXXXX265" and the end address "XXXXX777" converted by the address converting processing unit 16a) and expands it at the buffer memory 15 (step S603), and embeds (step S604) the sector data (the data transferred in from the host 1) relating to the write command into the area that is the object of the writing control (the start address "XXXXX265" and the end address "XXXXX777") in the sector data of one data frame expanded at the buffer memory 15, and writes the sector data of one data frame, in which the sector data relating to that write command is embedded, to the disk 13 as write data (step S605).

As described above, in the magnetic disk apparatus according the present embodiment, one data frame is formatted as one sector (refer to the format structural example of the present invention in FIG. 1). Therefore, the total amount of the areas that are not related to user capacity can be minimized, and the formatting efficiency can be improved.

In relation thereto, by making the total amount of the areas that are not related to user capacity be a minimum, the same user capacity as user capacities realized by existing formats can be realized at a lower storage density. Therefore, the accuracy of reading control/writing control of the head is not made stricter than needed, and difficulty in realizing the apparatus can be reduced. By making the total amount of the areas that are not related to user capacity be a minimum, it is possible to provide a larger user capacity than the user capacities realized by the existing formats.

In the magnetic disk apparatus according the present embodiment, the format existing at the firm side (e.g., "512 bytes/sector") can be emulated and reading control or writing control of the sector data can be carried out, and compatibility with existing formats can be ensured.

According to the present invention, there is provided a magnetic disk apparatus in which, because one data frame is formatted as one sector, the total amount of the areas that are not related to user capacity can be minimized, and the formatting efficiency can be improved. In relation thereto, by making the total amount of the areas that are not related to user capacity be a minimum, the same user capacity as user capacities realized by existing formats can be realized at a lower storage density. Therefore, the accuracy of reading control/writing control of the head is not made stricter than needed, and difficulty in realizing the apparatus can be reduced. By making the total amount of the areas that are not related to user capacity be a minimum, it is possible to provide a larger user capacity than the user capacities realized by the existing formats.

Furthermore, according to the present invention, there is provided a magnetic disk apparatus that, when the magnetic disk apparatus accepts a read-out request that is based on a format that is different from a format of the magnetic disk apparatus, the magnetic disk apparatus effects control so as to read sector data of one data frame including sector data relating to the read-out request, extract the sector data relating to the read-out request from the read sector data of one data frame, and read-out the extracted sector data as read-out data, and therefore, can emulate the format existing at the firm side (e.g., "512 bytes/sector") and can read out the sector data, such that compatibility with existing formats can be ensured.

Moreover, according to the present invention, there is provided a magnetic disk apparatus that, when the magnetic disk apparatus accepts a write-in request that is based on a format that is different from the format of the magnetic disk apparatus, the magnetic disk apparatus effects control so as to read sector data of one data frame including a area that is an object of writing control, embed sector data relating to the write-in request in the area that is the object of writing control in the read sector data of one data frame, and write the sector data of one data frame, in which the sector data relating to the write-in request is embedded, as write data, and therefore, can emulate the format existing at the firm side (e.g., "512 bytes/sector") and can write the sector data, such that compatibility with existing formats can be ensured.

Of the respective processing explained in the embodiments, all or a part of the processing explained as being performed automatically may be performed manually, or all or a part of the processing explained as being performed manually may be performed automatically in a known method. The information including the processing procedure, the control procedure, specific names, and various kinds of data and parameters shown in the data or in the drawing can be optionally changed, unless otherwise specified.

The respective constituents of the illustrated apparatus are functionally conceptual, and the physically same configuration is not always necessary. In other words, the specific mode of dispersion and integration of the apparatus is not limited to the illustrated ones, and all or a part thereof may be functionally or physically dispersed or integrated in an optional unit, according to the various kinds of load and the status of use.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A magnetic disk apparatus comprising:
   a servo frame that stores servo information; and
   a data frame that stores sector data between the servo frames, wherein
   a single data frame is formatted as a single sector; and
   when the magnetic disk apparatus receives a read-out request based on a format that is different from a format of the magnetic disk apparatus, the magnetic disk apparatus reads first sector data of a single data frame including second sector data relating to the read-out request, extracts the second sector data from the first sector data, and reads-out the second sector data extracted as read-out data.

2. The magnetic disk apparatus comprising:
a servo frame that stores servo information; and
a data frame that stores sector data between the servo frames, wherein
a single data frame is formatted as a single sector; and
when the magnetic disk apparatus receives a write-in request based on a format that is different from a format of the magnetic disk apparatus, the magnetic disk apparatus reads first sector data of a single data frame including an area that is an object of write-in control, embeds second sector data relating to the write-in request in the area, and writes-in the first sector data, in which the second sector data is embedded, as write data.

* * * * *